United States Patent [19]

Yasui et al.

[11] 4,287,431

[45] Sep. 1, 1981

[54] ELECTRIC CONTROL CIRCUIT FOR SAFETY APPARATUS IN AUTOMOTIVE VEHICLES

[75] Inventors: Toshio Yasui, Obu; Motoharu Naito, Okazaki, both of Japan

[73] Assignee: Nippondenso Co., Ltd., Kariya, Japan

[21] Appl. No.: 942,816

[22] Filed: Sep. 15, 1978

[30] Foreign Application Priority Data

Sep. 20, 1977 [JP] Japan .................................. 52-113477

[51] Int. Cl.$^3$ ............................................. B60R 21/08
[52] U.S. Cl. ............................ 307/10 R; 340/52 H; 280/735; 180/274; 180/282
[58] Field of Search ............... 340/52 H, 52 R; 307/9, 307/10 R; 280/735; 180/274, 278

[56] References Cited

U.S. PATENT DOCUMENTS

| | | | |
|---|---|---|---|
| 3,629,816 | 12/1971 | Gillund | 180/103 X |
| 3,849,759 | 11/1974 | Hosaka et al. | 307/10 R X |
| 3,890,594 | 6/1975 | Hoska et al. | 307/10 R X |

FOREIGN PATENT DOCUMENTS

52-33233  3/1977  Japan .................................... 307/10 R

Primary Examiner—L. T. Hix
Assistant Examiner—James L. Dwyer
Attorney, Agent, or Firm—Cushman, Darby & Cushman

[57] ABSTRACT

In an electric control circuit for a safety apparatus including an actuator in series with an electric power source through a normally open switch to be electrically operated upon closure of the switch in the occurrence of a vehicle collision, a resistor is connected in parallel with the switch and has a predetermined resistance value defining an electric current applied to the actuator through the resistor to maintain the actuator inoperative. The control circuit further comprises a differential amplifier for amplifying a terminal voltage appearing between the opposite ends of the actuator to generate an amplified voltage therefrom, a constant voltage generator for generating a constant voltage therefrom, a comparator for comparing the amplified voltage with the constant voltage to generate an output signal therefrom when the amplified voltage becomes lower or higher than the constant voltage, and an indicator for informing of malfunction of the control circuit in response to the output signal from the comparator.

4 Claims, 1 Drawing Figure

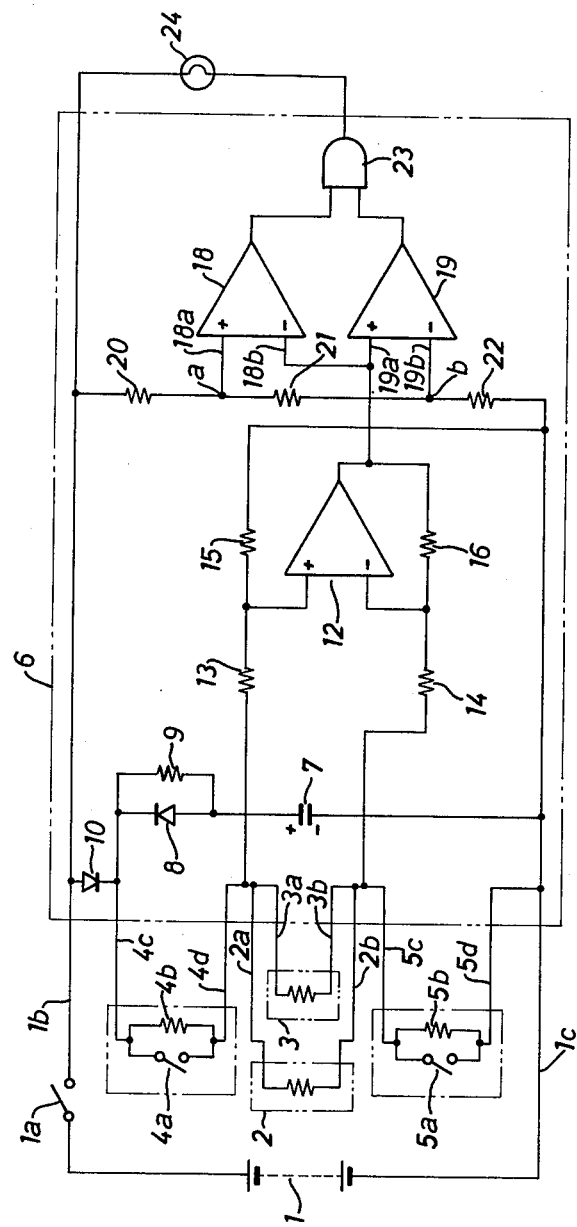

ELECTRIC CONTROL CIRCUIT FOR SAFETY APPARATUS IN AUTOMOTIVE VEHICLES

BACKGROUND OF THE INVENTION

The present invention relates to an electric control circuit for a safety apparatus adapted to be actuated by an electrically operated actuator, and more particularly to an electric control circuit in which an electric power source in the form of a vehicle battery is connected through a normally open switch with the actuator to supply electric energy to the actuator when the switch is closed in the occurrence of a vehicle collision.

In such an electric control circuit as noted above, the vehicle battery is assembled within an engine room compartment, and the switch is mounted on the front bumper of the vehicle or a central portion of the vehicle chassis. Meanwhile, the actuator is housed within the safety apparatus located in the passenger compartment. In the electric wiring of the control circuit, a number of conductors leading from the vehicle battery are connected at a long distance with the switch and actuator. If the conductors are disconnected or shorted with another conductor, the actuator may not be supplied with electric energy from the battery in the occurrence of a vehicle collision, and the safety apparatus then remains inoperative. This means that various shorts or disconnections of the conductors must be detected prior to the occurrence of a vehicle collision.

SUMMARY OF THE INVENTION

It is, therefore, a primary object of the present invention to provide an improved electric control circuit in which various disconnections or shorts of the conductors are always monitored prior to or after start of the vehicle.

Accordingly, the present invention provides an electric control circuit for a safety apparatus of an automotive vehicle, the control circuit comprising:

an electric power source, normally open switch means to be closed in the occurrence of a vehicle collision, electrically operated actuator means connected in series with the power source through the switch means to actuate the safety apparatus upon closure of the switch means, a resistor connected in parallel with the switch means and having a predetermined resistance value defining an electric current applied to the actuator means through the resistor to maintain the actuator means inoperative, a differential amplifier connected to the opposite ends of the actuator means for amplifying a terminal voltage appearing between the opposite ends of the actuator means to generate an amplified voltage therefrom, a constant voltage generator connected in series with the power source for generating a constant voltage therefrom, a comparator for comparing the amplified voltage of the amplifier with the constant voltage to generate an output signal therefrom when the amplified voltage becomes lower or higher than the constant voltage, and means for informing of malfunction of the control circuit in response to the output signal from the comparator.

BRIEF DESCRIPTION OF THE DRAWING

The above mentioned and further objects and features of the present invention will become clearer from the following description in reference with the accompanying drawing, which depicts a preferred embodiment of an electric control circuit in accordance with the present invention.

DESCRIPTION OF THE PREFERRED EMBODIMENT

Now referring to the accompanying drawing, there is illustrated an electric control circuit in accordance with the present invention which is adapted to a safety apparatus for an automotive vehicle. The safety apparatus includes a pair of conventional primers 2, 3 to be fired electrically to supply fluid under pressure into an inflatable air bag. The primers 2, 3 are in parallel with each other by conductors 2a, 3a, 2b, 3b and have a small internal resistance value (for instance, 2Ω) respectively.

The electric control circuit comprises a pair of collision sensors 4a, 5a which are provided on the front bumper of the vehicle and a central portion of the vehicle chassis respectively. Each of the sensors 4a, 5a is in the form of a normally open switch to be closed upon deceleration of the vehicle in excess of a predetermined magnitude. The sensor 4a has one end connected to the primers 2, 3 through a conductor 4d and the conductors 2a, 3a and the other end connected to the cathode of a diode 10 through a conductor 4c. The diode 10 is also connected at its cathode to the positive electrode of a storage condenser 7 through a diode 8 and a resistor 9, the condenser 7 being in the form of an aluminum electrolytic condenser of a large capacitance value. The anode of diode 10 is connected to the positive electrode of a primary electric power source in the form of a vehicle battery 1 through a conductor 1b and an ignition switch 1a. The sensor 5a has one end connected to the primers 2, 3 through a conductor 5c and the conductors 2b, 3b and the other end connected to the negative electrode of condenser 7 through a conductor 5d and to the negative electrode of battery 1 through the conductor 5d and a conductor 1c.

When the ignition switch 1a is closed, the storage condenser 7 is charged with an electric current from battery 1 through the diode 10 and resistor 9. If one of the conductors 1b, 1c is disconnected in the occurrence of a vehicle collision, the storage condenser 7 is discharged through the diode 8 upon closure of the sensors 4a, 5a to fire the primers 2, 3. From the above description, it will be noted that the storage condenser 7 acts as a secondary electric power source for the primers 2, 3.

The sensors 4a, 5a are also in parallel with resistors 4b, 5b respectively, of which each resistance value is predetermined to be about 500Ω such that each electric current through the primers 2, 3 is restricted below a predetermined electric current for firing each of the primers 2, 3. When the electric current from battery 1 is applied to the primers 2, 3 through the diode 10, resistors 4b, 5b under closure of switch 1a, a terminal voltage Vs appears between the opposite ends of each of primers 2, 3.

The electric control circuit further comprises a differential amplifier 12 having first and second input resistors 13, 14 connected respectively to the opposite ends of each of primers 2, 3. When the amplifier 12 receives at its first and second input resistors 13, 14 the terminal voltage Vs from primers 2, 3, it amplifies the terminal voltage Vs to generate an output or amplified voltage Vd at its output terminal. In addition, resistance values of the input resistors 13, 14 are predetermined to be respectively equal to resistors 15, 16.

The amplifier 12 is connected at its output terminal to a second input terminal 18b of a comparator 18 and to a first input terminal 19a of a comparator 19. The comparator 18 is connected at its first input terminal 18a to a junction a between resistors 20, 21, and the comparator 19 is connected at its second input terminal 19b to a junction b between the resistor 21 and a resistor 22. The resistors 20, 21, 22 provide a voltage divider which is in series with the battery 1 through the ignition switch 1a to generate high and low divided constant voltages Va, Vb at junctions a, b. When the amplified voltage Vd from amplifier 12 is maintained in a value between the high and low constant voltages Va, Vb, the comparators 18, 19 generate high level signals therefrom respectively. When the amplified voltage Vd becomes higher than the high constant voltage Va, the comparators 18, 19 generate low and high level signals therefrom respectively. When the amplified voltage Vd becomes lower than the low constant voltage Vb, the comparators 18, 19 generate high and low level signals respectively therefrom.

An AND gate 23 has input terminals connected to the output terminals of comparators 18, 19. AND gate 23 generates a high level signal therefrom in response to the high level signals from comparators 18, 19 and also generates a low level signal therefrom in response to one of the low level signals from comparators 18, 19. An indication lamp 24 is provided within a compartment of the vehicle and is connected between the anode of diode 10 and the output terminal of AND gate 23. While the ignition switch 1a is closed, the indication lamp 24 is energized with electric energy from the battery 1 in response to the low level signal from AND gate 23 to inform the operator of malfunction of the electric control circuit. In practice, the whole component elements enclosed by an imaginary line 6 in the FIGURE are assembled within a sealed case (not shown) to protect the component elements from damages in the occurrence of a vehicle collision.

The mode of operation of the embodiment will now be described in detail. When the ignition switch 1a is closed to start the vehicle, the condenser 7 is charged, the voltage divider generates high and low constant voltages Va, Vb, the primers 2, 3 generate a terminal voltage Vs, and the amplifier 12 generates an amplified voltage Vd upon receiving the terminal voltage Vs.

In normal operation, the amplified voltage Vd is maintained in a value between the high and low constant voltages Va, Vb. Then, the comparator 18 generates a high level signal in response to the high constant and amplified voltages Va, Vd, and the comparator 19 also generates a high level signal in response to the amplified and low constant voltages Vd, Vb. When AND gate 23 receives the high level signals from comparators 18, 19, it generates a high level signal which is applied to the indication lamp 24. Thus, the indication lamp 24 may not be lit to inform the operator of normality of the electric control circuit prior to or after start of the vehicle. Under such a condition, if the sensors 4a, 5a are respectively closed upon the occurrence of a vehicle collision, the primers 2, 3 are energized by electric energy supplied from the battery 1 through the diode 10. If one of the conductors 1b, 1c is disconnected, the storage condenser 7 is discharged through the diode 8 to energize the primers 2, 3.

In case one of the primers 2, 3 is shorted or one of the conductors 4c, 5c is disconnected, the amplified voltage Vd becomes lower than the low constant voltage Vb due to decrease of the terminal voltage Vs. Then, the comparator 18 generates a high level signal in response to the high constant and amplified voltages Va, Vd, and the comparator 19 generates a low level signal in response to the amplified and low constant voltages Vd, Vb. When AND gate 23 receives the high and low level signals from comparators 18, 19, it generates a low level signal which is applied to the indication lamp 24. Thus, the indication lamp 24 is lit to inform the operator of malfunction of the electric control circuit prior to or after start of the vehicle.

In case one of the conductors 2a, 3a is disconnected or one of the sensors 4a, 5a is shorted, the amplified voltage Vd becomes higher than the high constant voltage Va due to increase of the terminal voltage Vs. Then, the comparator 18 generates a low level signal in response to the high constant and amplified voltages Va, Vd, and the comparator 19 generates a high level signal in response to the amplified and low constant voltages Vd, Vb. When AND gate 23 receives the low and high level signals from comparators 18, 19, it generates a low level signal which is applied to the indication lamp 24. Thus, the indication lamp 24 is lit to inform the operator of malfunction of the electric control circuit.

EXAMPLE OF EXPERIMENTATION

In a premise that,
a terminal voltage of battery 1 is 12 V,
an amplification factor of amplifier 12 is 100,
a high constant voltage of the voltage divider is 1.8 V, and
a low constant voltage of the voltage divider is 0.6 V,
the following experimental data has been obtained in relation to modes of operation of the electric control circuit. In addition, characters L and H represent low and high level signals respectively.

|  | Terminal voltage Vs (mV) | Amplified voltage Vd (V) | Output voltage of comparator 18 | Output voltage of comparator 19 | Output voltage of AND gate 23 |
|---|---|---|---|---|---|
| Normality | 12 | 1.2 | H | H | H |
| Short of primer 2 or 3 | 0 | 0 | H | L | L |
| Disconnection of conductor 4c or 5c | 0 | 0 | H | L | L |
| Disconnection of conductor 2a or 3a | 24 | 2.4 | L | H | L |
| Short of sensor 4a or 5a | 24 | 2.4 | L | H | L |

Thus, it has been experimentally recognized that the indication lamp 24 functions to inform the operator of normality or abnormality of the electric control circuit in relation to the above-noted modes of operation.

In practice, it is to be noted that the present invention may be adapted to various kinds of safety apparatuses for automotive vehicles. In this case, a pair of collision sensors may be respectively connected in parallel with a pair of the sensors 4a, 5a.

Having thus described the preferred embodiment of the invention it should be understood that numerous structural modifications and adaptations may be re- sorted to without departing from the spirit of the invention.

What is claimed is:

1. In an electric control circuit for a safety apparatus of an automotive vehicle, which control circuit comprises a series connection of an electric power source, a plurality of normally open switch means to be closed in the occurrence of a vehicle collision, and electrically operated actuator means for actuating said safety apparatus upon closure of said switch means, said circuit further comprising a resistor connected in parallel with each of said switch means, said resistor having a predetermined resistance value defining an electric current applied to said actuator means through said resistor to normally maintain said actuator means inoperative, the improvement comprising:

means in said series connection for directly joining each resistor and each of said switch means to said actuator means, a differential amplifier connected to the opposite ends of said actuator means for directly amplifying a terminal voltage appearing between the opposite ends of said actuator means to generate an amplified voltage therefrom, a constant voltage generator connected in series with said power source for generating a constant voltage therefrom, a comparator for comparing the amplified voltage of said amplifier with the constant voltage to generate an output signal therefrom when the amplified voltage becomes lower or higher than the constant voltage, and means for informing of malfunction of said control circuit in response to the output signal from said comparator.

2. In an electric control circuit for a safety apparatus of an automotive vehicle, which control circuit comprises a series connection of an electric power source, a plurality of normally open switch means to be closed in the occurrence of a vehicle collision, and electrically operated actuator means for actuating said safety apparatus upon closure of said switch means, said circuit further comprising a resistor connected in parallel with each of said switch means, said resistor having a predetermined resistance value defining an electric current applied to said actuator means through said resistor to normally maintain said actuator means inoperative, the improvement comprising:

means in said series connection for directly joining each resistor and each of said switch means to said actuator means, a differential amplifier connected to the opposite ends of said actuator means for directly amplifying a terminal voltage appearing between the opposite ends of said actuator means to generate an amplified voltage therefrom, a constant voltage generator connected in series with said power source for generating low and high constant voltages therefrom, a first comparator for comparing the amplified voltage of said amplifier with the low constant voltage to generate an output signal therefrom when the amplified voltage becomes lower than the low constant voltage, a second comparator for comparing the amplified voltage with the high constant voltage to generate an output signal therefrom when the amplified voltage becomes higher than the high constant voltage, and means for informing the malfunction of said control circuit in response to one of the output signals from said first and second comparators.

3. An electric control circuit as claimed in claim 1 or 2, wherein said electrically operated actuator means includes first and second electrically operated actuators connected in parallel with each other.

4. An electric control circuit as claimed in claim 1 or 2, wherein a storage condenser is connected in parallel with the series connection of said switch means and said actuator means.

* * * * *